United States Patent
Prakash et al.

(10) Patent No.: US 10,101,985 B1
(45) Date of Patent: Oct. 16, 2018

(54) SCALABLE ECOSYSTEM FOR ENTERPRISE MOBILITY

(71) Applicant: Oracle International Corporation, Redwood Shores, CA (US)

(72) Inventors: Abhishant Prakash, Bangalore (IN); Alex Mathew Jayaraj, Bangalore (IN); Pramod Valavala, Bangalore (IN); Raj Kishor Paswan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/592,530

(22) Filed: May 11, 2017

(51) Int. Cl.
  *G06F 9/445* (2018.01)
  *G06F 8/61* (2018.01)
  *H04L 29/08* (2006.01)

(52) U.S. Cl.
  CPC ............... *G06F 8/61* (2013.01); *H04L 67/34* (2013.01)

(58) Field of Classification Search
  CPC ....................................................... G06F 9/445
  USPC ................................................. 717/175–178
  See application file for complete search history.

(56) References Cited

U.S. PATENT DOCUMENTS

| | | | |
|---|---|---|---|
| 8,635,522 B2 | 1/2014 | Lee et al. | |
| 9,069,375 B2 | 6/2015 | Padmavilasom | |
| 9,274,784 B2 | 3/2016 | Wang et al. | |
| 2012/0173715 A1* | 7/2012 | Selitser | H04L 67/2809 709/224 |
| 2013/0091557 A1 | 4/2013 | Gurrapu | |
| 2013/0212559 A1* | 8/2013 | Lehtimaki | G06F 8/38 717/109 |
| 2015/0082298 A1 | 3/2015 | Wang et al. | |
| 2015/0113504 A1 | 4/2015 | Artzi et al. | |
| 2015/0347119 A1* | 12/2015 | Wang | G06F 8/65 717/120 |

OTHER PUBLICATIONS

Webpage, "Progress Telerik Platform", downloaded from http://www.telerik.com/platform/#design, 8 pages, retrieved Jul. 19, 2017.
Webpage, "Welcome to AppBuilder!", downloaded from http://docs.telerik.com/platform/appbuilder/, 1 page, retrieved Nov. 14, 2016.

(Continued)

*Primary Examiner* — Jae Jeon
(74) *Attorney, Agent, or Firm* — Tucker Ellis LLP (57) ABSTRACT

In accordance with an embodiment, described herein is a system and method for enabling cross-platform deployment of enterprise software applications, as mobile applications, to different mobile device platforms. A server-based deployment platform, including a mobile application repository, application publisher, and application marketplace, enables the publishing of hybrid application packages that provide enterprise application functionality and can be rendered on different mobile device platforms. A cross-platform mobile application, provided at a mobile device, includes a hybrid application package manager and a container for storing one or more hybrid application packages, and renders the hybrid application packages to provide access to their enterprise application functionality, independently of the device's mobile operating system.

20 Claims, 7 Drawing Sheets

(56) References Cited

OTHER PUBLICATIONS

Webpage, "Application Development with the Telerik Platform", downloaded from http://docs.telerik.com/platform/help/getting-started/app-development, 3 pages, retrieved Nov. 14, 2016.
Webpage, "Hybrid or NativeScript—Choosing the Path for You", downloaded from http://docs.telerik.com/platform/help/getting-started/hybrid-or-native, 7 pages, retrieved Nov. 14, 2016.
Webpage, "Mobile App Development Fast, Easy and Flexible", downloaded from https://monica.io/, 5 pages, retrieved Nov. 14, 2016.
Webpage, "Monaca Development Overview", downloaded from https://docs.monica.io/en/quick_start/monaca_intro/#monaca-development-tools, 11 pages, retrieved Jul. 19, 2017.
Webpage, "Iconic Documentation Overview", downloaded from http://ionicframework.com/docs/overview/#download, 6 pages, retrieved Nov. 14, 2016.
Webpage, "Sencha Touch", downloaded from https://www.sencha.com/products/touch/#overview, 4 pages, retrieved Nov. 14, 2016.

\* cited by examiner

SCALABLE ECOSYSTEM FOR ENTERPRISE MOBILITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to the development of software applications for use with mobile devices, and are particularly related to systems and methods for enabling cross-platform deployment of enterprise software applications to different mobile device platforms.

BACKGROUND

Today's corporate enterprises often require their software developers to build, maintain, and deploy different versions of their enterprise software applications for use with different types of mobile platforms, including different types of mobile devices and mobile operating systems.

This requirement to maintain a separate codeline for each supported mobile platform, and corresponding versions of a mobile application, increases the development complexity and cost associated with that mobile application.

In recent years, the software industry has tried to address this issue through the use of technologies such as mobile hybrid applications, which can include, for example, a single web application (i.e., web app) packaged into a number of otherwise separate native container applications, for use with various supported mobile platforms.

However, for an enterprise wishing to offer a large number of mobile applications to its users, the cost of deploying and publishing the mobile applications to several different marketplaces associated with the various supported mobile platforms, continues to have a large impact on the overall cost of application development.

SUMMARY

In accordance with an embodiment, described herein is a system and method for enabling cross-platform deployment of enterprise software applications, as mobile applications, to different mobile device platforms. A server-based deployment platform, including a mobile application repository, application publisher, and application marketplace, enables the publishing of hybrid application packages that provide enterprise application functionality and can be rendered on different mobile device platforms. A cross-platform mobile application, provided at a mobile device, includes a hybrid application package manager and a container for storing one or more hybrid application packages, and renders the hybrid application packages to provide access to their enterprise application functionality, independently of the device's mobile operating system.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments can be practiced without these specific details. The enclosed specification and drawings are not intended to be restrictive to those embodiments described herein.

As described above, for an enterprise wishing to offer a large number of mobile applications to its users, the cost of deploying and publishing the mobile applications to several different marketplaces associated with various supported mobile platforms, continues to have a large impact on the overall cost of application development.

In accordance with an embodiment, described herein is a system and method (embodiments of which are referred to herein in some examples as "Scalable Ecosystem for Enterprise Mobility" (SEEM)) for enabling cross-platform deployment of enterprise software applications, as mobile applications, to different mobile device platforms.

In accordance with an embodiment, a server-based deployment platform, including a mobile application repository, application publisher, and application marketplace, enables the publishing of hybrid application packages that provide enterprise application functionality and can be rendered on different mobile device platforms.

In accordance with an embodiment, a cross-platform mobile application, provided at a mobile device, includes a hybrid application package (HAP) manager and a container for storing one or more hybrid application packages, and renders the hybrid application packages to provide access to their enterprise application functionality, independently of the device's mobile operating system.

In accordance with an embodiment, in addition to enabling cross-platform deployment of enterprise software applications to different supported mobile platforms, the system enables centralized control by an enterprise over its enterprise applications, for example on an individualized or per-user basis, such that the enterprise can more readily control access, roles, and/or permissions granted to the users of its enterprise applications.

Scalable Ecosystem for Enterprise Mobility

Figure 1:
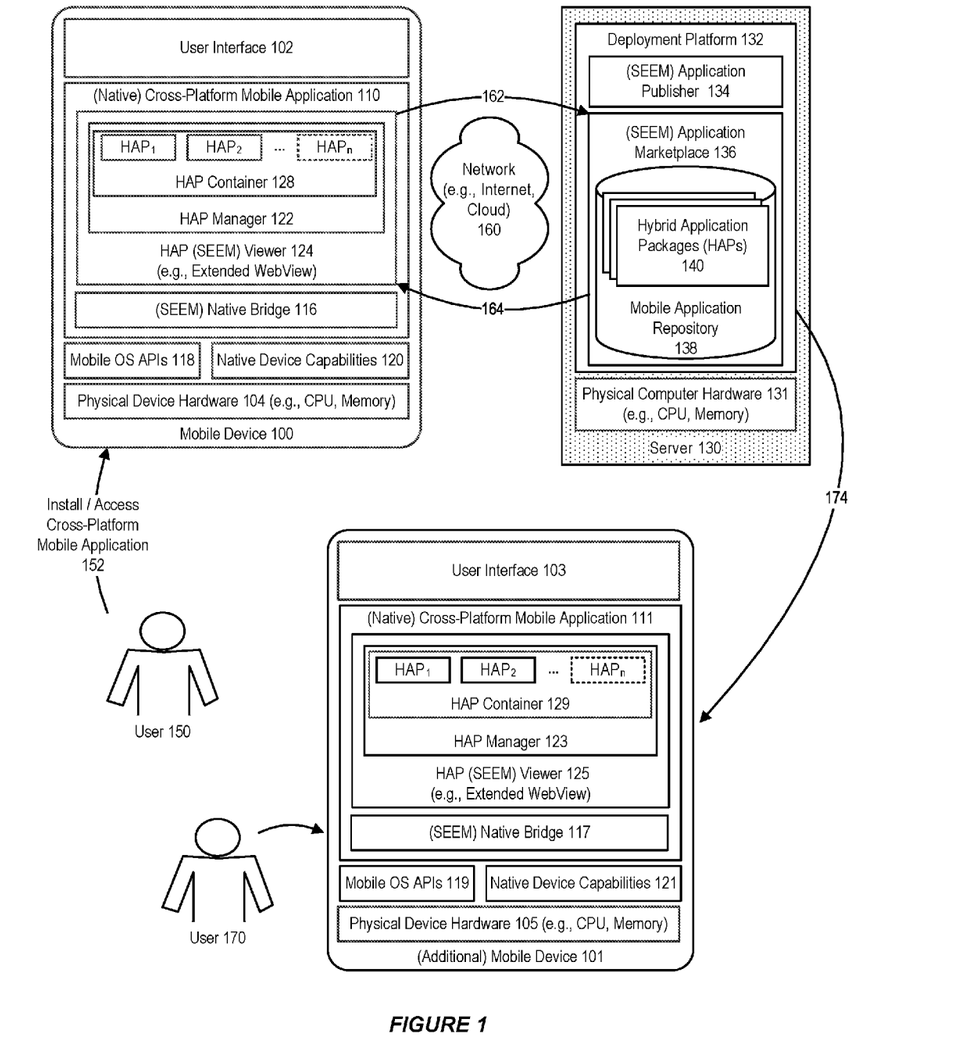
FIG. 1 illustrates a system that enables cross-platform deployment of enterprise software applications, in accordance with an embodiment.

FIG. 1 illustrates a system that enables cross-platform deployment of enterprise software applications, in accordance with an embodiment.

As illustrated in FIG. 1, in accordance with an embodiment, for each of a plurality of mobile devices 100, 101, having a user interface 102, 103, and physical device hardware 104, 105 (e.g., CPU, memory), the mobile device can be provided with a (native) cross-platform mobile application 110, 111, for execution thereon.

In accordance with an embodiment, each mobile device can also include a (SEEM) native bridge 116, 117, for communication with one or more mobile operating system (OS) APIs 118, 119, and/or native device capabilities 120, 121.

In accordance with an embodiment, the cross-platform mobile application provided at each mobile device can also include a hybrid application package (HAP) manager 122, 123, HAP (SEEM) viewer 124, 125, such as, for example, an extended WebView component, and (native) HAP container 128, 129, for storing one or more hybrid application packages, and rendering those hybrid application packages to provide access to their enterprise application functionality, as further described below.

As further illustrated in FIG. 1, in accordance with an embodiment, the mobile device can communicate with a server 130, that includes a physical computer hardware 131 (e.g., CPU, memory) and provides a server-based deployment platform 132.

In accordance with an embodiment, the server-based deployment platform can include a (SEEM) application publisher 134, (SEEM) application marketplace 136, and mobile application repository 138, which together enable the publishing of a plurality of hybrid application packages 140 that provide enterprise application functionality and can be rendered on different mobile device platforms.

In accordance with an embodiment, the HAP manager operates as a control component or layer for managing and sandboxing hybrid application packages received from the server-based deployment platform, in response to requests from a user 150 to install/access 152 the cross-platform mobile application on their mobile device.

A user of a mobile device that includes a cross-platform mobile application, who wishes to install a hybrid application package on their mobile device, to provide access to its enterprise application functionality, can communicate via a network 160 (e.g., the Internet, or a cloud environment), a request 162 from their mobile device to the application marketplace, to receive 164 an appropriate hybrid application package.

A user 170 of another/additional mobile device can similarly communicate a request from their mobile device to the application marketplace, to receive 174 an appropriate hybrid application package.

In accordance with an embodiment, each hybrid application package is an archive of a corresponding hybrid application's artifacts (assets), including for example, an application data, code (e.g., HTML, CSS, JS), content, or other resources associated with that hybrid application. In some embodiments, the HAP manager can itself be provided as a hybrid application.

In accordance with an embodiment, the HAP manager can perform control functions in connection with the mobile device's use of hybrid application packages, such as, for example, installation, updating, and/or uninstallation of selected hybrid application packages to the mobile device.

In accordance with an embodiment, the system, including the use of a cross-platform mobile application at each of a plurality of mobile devices, enables centralized control by an enterprise over its enterprise applications, for example on an individualized or per-user basis, such that the enterprise can more readily control access, roles, and/or permissions granted to the users of its enterprise applications, when run as mobile applications on those mobile devices.

For example, in accordance with an embodiment, an enterprise can elect to perform a remote wipe of a particular mobile device's enterprise application functionality, including the use of the HAP manager to revoke access by any user, at any point in time, via a push notification to the user's mobile device. In response to receiving the push notification, the HAP manager removes appropriate enterprise hybrid application packages and associated data from the user's device in accordance with the push notification.

In accordance with an embodiment, the HAP viewer, such as, for example, an extended WebView component, enables one or more hybrid application packages to be displayed to and accessed by a user via the HAP viewer.

For example, in accordance with an embodiment, the HAP viewer can be used to display a list of available hybrid application packages and to render selected hybrid application packages and their enterprise application functionality on the mobile device.

In accordance with an embodiment, the HAP viewer, such as, for example, an extended WebView component, also enables the HAP manager to multitask between multiple running hybrid application packages (HAP instances) on the mobile device, without losing data or context for any individual running hybrid application package.

In accordance with an embodiment, the HAP container provides a centralized container for storing hybrid application packages installed on the mobile device through the HAP manager. The HAP container can also contain data for each hybrid application package, including, for example user login credentials, or other encrypted data.

In accordance with an embodiment, the use of the HAP container avoids the need for the multiple separate containers that would typically be required with a conventional deployment process to deploy a hybrid application through different platform-specific distribution channels. Since each mobile application's data is contained within a centralized location, there is also a reduced risk of data exposure.

In accordance with an embodiment, the centralized HAP container also enables users to access all of their hybrid application packages via, for example, a single sign-on, and to move between a plurality of hybrid application packages without losing context or data.

In accordance with an embodiment, the cross-platform mobile application can include additional features, such as use of a cloud services adaptor, which can be utilized by the hybrid application packages to access cloud services (e.g., Oracle cloud services) more securely, since as described above, the associated data is largely contained within the centralized location of the HAP container.

In accordance with an embodiment, the native bridge provided at the mobile device can be loaded (preloaded) with one or more plugins that enable hybrid application packages to interact with one or more mobile operating system (OS) APIs, and/or native device capabilities.

Examples of such native device capabilities can include camera, SMS, contacts, geolocation, file system, biometric sensors, local notifications, and network access.

For example, in accordance with an embodiment, the native bridge can provide access to a plurality of, e.g., Cordova plugins, that enable hybrid application packages to utilize native device capabilities. The native bridge can also be used to link each of the hybrid application packages provided at the mobile device, to the plugins, so that each hybrid application package exhibits a similar look-and-feel to that of a native mobile application.

Hybrid Application Development

Figure 2:
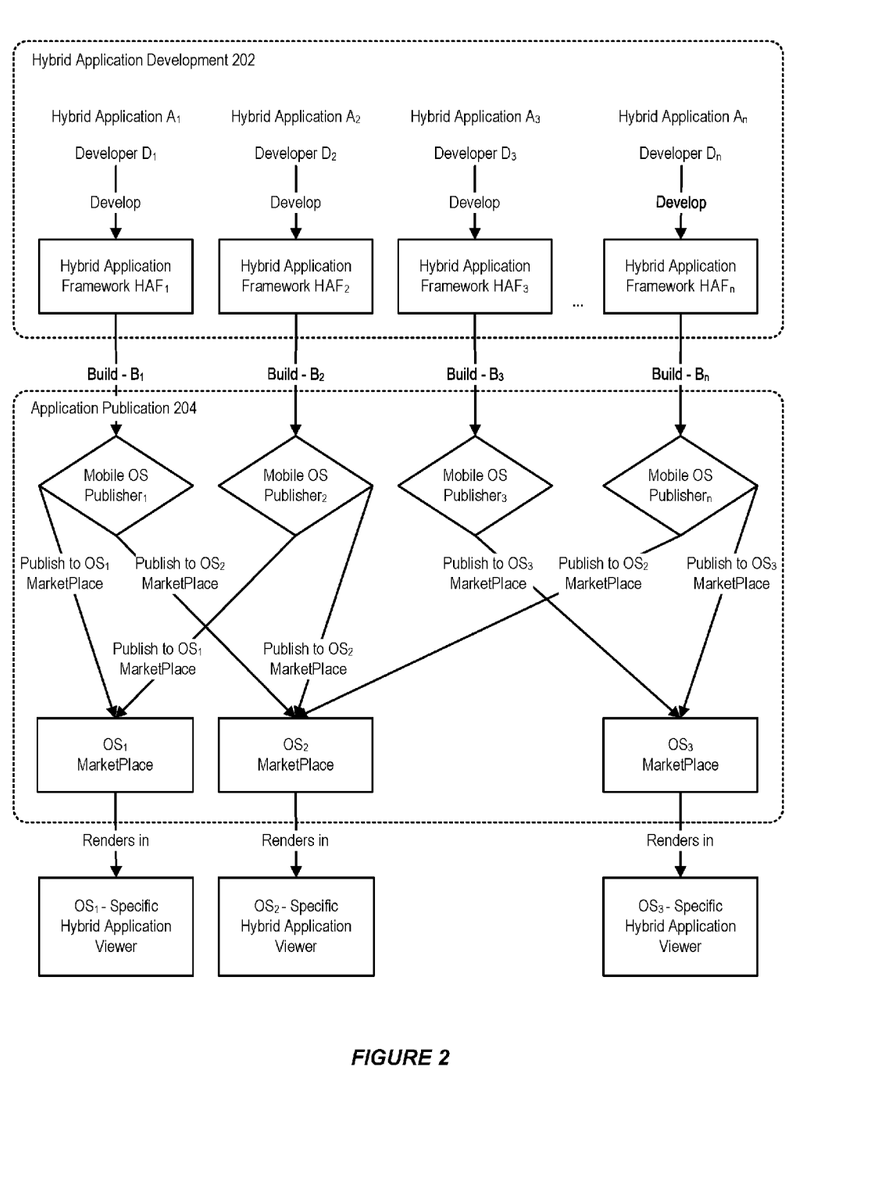
FIG. 2 illustrates an example of a conventional hybrid application development process.

FIG. 2 illustrates an example of a conventional hybrid application development process, for a plurality of hybrid applications $A_1 \ldots A_n$ developed by a plurality of developers $D_1 \ldots D_n$ utilizing a plurality of hybrid application frameworks $HAF_1 \ldots HAF_n$.

As illustrated in FIG. 2, with a conventional process, during application development 202, for each hybrid application, a developer can utilize a hybrid application framework (HAF) to build their application. During application publication 204, the developer can then publish the application to one or more operating system (OS) marketplaces, via one or more mobile operating system (MOS) publishers, e.g., MOS Publisher$_1$ ... MOS Publisher$_n$.

For each hybrid application and each particular OS, an OS marketplace can render the hybrid application in a viewer that is specific to that particular OS.

The complexity and cost of developing hybrid applications can be affected by several factors such as, for example, the number of application display screens, the complexity of the screens, e-commerce features, integration with third-party application programming interfaces (APIs), developer cost, the HAF used to build the application, or the cost of publishing the application to different mobile marketplaces.

For example, the overall cost for development of a hybrid application using a conventional process can be described as:

$$C(i) = (Ai + Di + HAFi + Pi + Mi)$$

$$\text{Total Development Cost} = \sum_{i=1}^{n} C(i)$$

Where above, for an application i, Ai denotes its development cost; Di denotes its developer cost; HAFi denotes its HAF cost; Pi denotes its publishing cost; and Mi denotes its maintenance cost.

For enterprises wishing to provide a large number of mobile hybrid applications, the cost of deploying and publishing the mobile applications to each of several different marketplaces associated with various supported mobile platforms, continues to have a large impact on the overall cost of application development.

Figure 3:
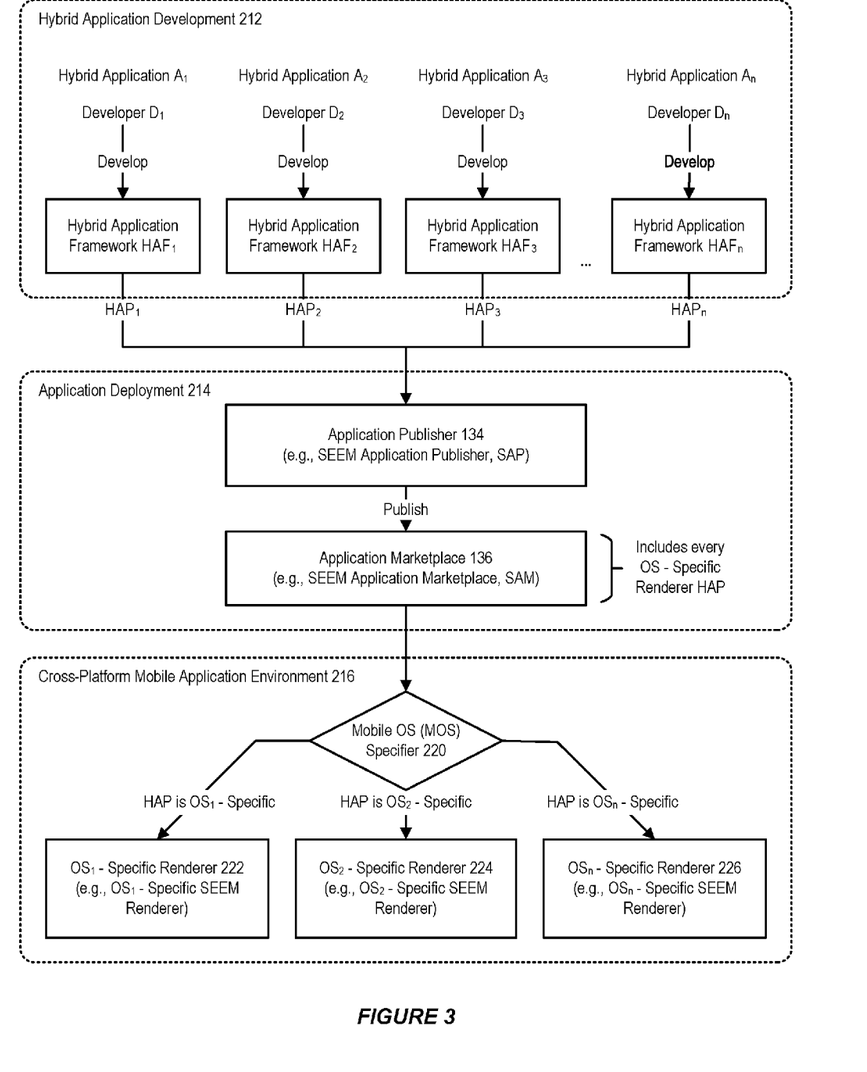
FIG. 3 illustrates a hybrid application development process, in accordance with an embodiment.

FIG. 3 illustrates a hybrid application development process, in accordance with an embodiment.

As illustrated in FIG. 3, in accordance with an embodiment, during application development 212, a plurality of hybrid applications $A_1 \ldots A_n$ can be similarly developed by a plurality of developers $D_1 \ldots D_n$ utilizing a plurality of hybrid application frameworks $HAF_1 \ldots HAF_n$.

However, unlike the conventional process described above, in accordance with an embodiment, during application deployment 214, the application publisher (e.g., a SEEM application publisher (SAP)) enables developers to publish their respective HAPs to the application marketplace (e.g., a SEEM application marketplace (SAM)), which provides a central repository for HAPs and can include any HAP independently of the mobile operating system in which it will be ultimately rendered.

In accordance with an embodiment, within the cross-platform mobile application environment 216, a MOS specifier 220 determines which OS of a plurality of OS's (e.g., $OS_1 \ldots OS_n$) a particular HAP is specific to, or is otherwise associated with. Based on this determination, the HAP can be rendered in an appropriate OS-specific (SEEM) renderer.

In accordance with an embodiment, the use of a system enables an enterprise to reduce the overall cost associated with application development. For example, the central repository eliminates the need to provide multiple, separate containers for deploying an application to different platforms. Similarly, the enterprise does not incur the cost of building and maintaining separate applications and containers for different MOS's.

For example, in accordance with an embodiment, the overall cost for development of a hybrid application utilizing a system can be described as:

$$C(i) = (Ai + Di + HAFi)$$

$$\text{Total Development Cost} = \sum_{i=1}^{n} C(i) + SEEM$$

Where above, for an application i, Ai denotes its development cost; Di denotes its developer cost; HAFi denotes its HAF cost; and SEEM denotes the cost of hosting and publishing HAPs to a central repository.

When the number of MOS's for which an application is built (M); and the number of applications built by an enterprise (N) are taken into account, the overall development cost compared with a conventional process can be described as, for example:

Total development cost using conventional methods=$M \times N \times C$

Total development cost using system=C

As illustrated above, in accordance with an embodiment, the factor by which the development cost is reduced using the above approach equals M×N over a conventional approach; coupled with the additional savings in ongoing maintenance of the software, and improved fine-grained control over the enterprise's access to its software applications.

Hybrid Application Package Lifecycle

Figure 4:
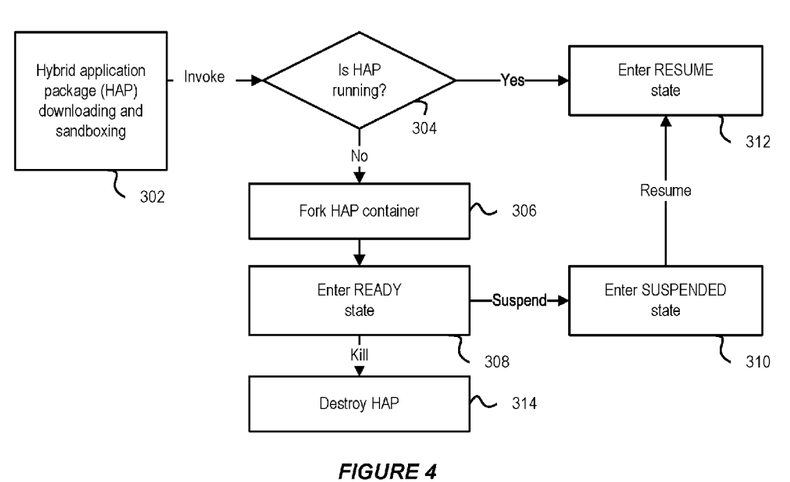
FIG. 4 illustrates a lifecycle associated with a hybrid application package, in accordance with an embodiment.

FIG. 4 illustrates a lifecycle associated with a hybrid application package, in accordance with an embodiment.

As illustrated in FIG. 4, in accordance with an embodiment, initialization of a particular hybrid application package begins when the hybrid application package is downloaded through a cross-platform mobile application to a mobile device.

For example, as described above, a user of a cross-platform mobile application, wishing to install a hybrid application package on their mobile device, to provide access to its enterprise application functionality, can communicate via a network, a request to the application marketplace, to retrieve an appropriate hybrid application package.

At step 302, a downloading and sandboxing operation is performed to download and sandbox the hybrid application package in a centralized container (e.g., the HAP container) on the user's mobile device.

At step 304, the downloading and sandboxing operation invokes a determination by the cross-platform mobile application of whether the downloaded hybrid application package is running.

If the hybrid application package is determined not be running, the process, at step 306, can fork the HAP container, and place the hybrid application package in a READY state.

At step 308, the hybrid application package remains in the READY state, until it is transitioned, at step 310, to a SUSPENDED state, from which it can be, at step 312, resumed (i.e., placed in a RESUME state); or alternatively, at step 314, a kill instruction is received that causes the process to destroy the running hybrid application package instance.

If, at step 304, the hybrid application package is determined to be running, then the process places the HAP in a RESUME state.

Cross-Platform Deployment of Enterprise Software Applications

Figure 5:
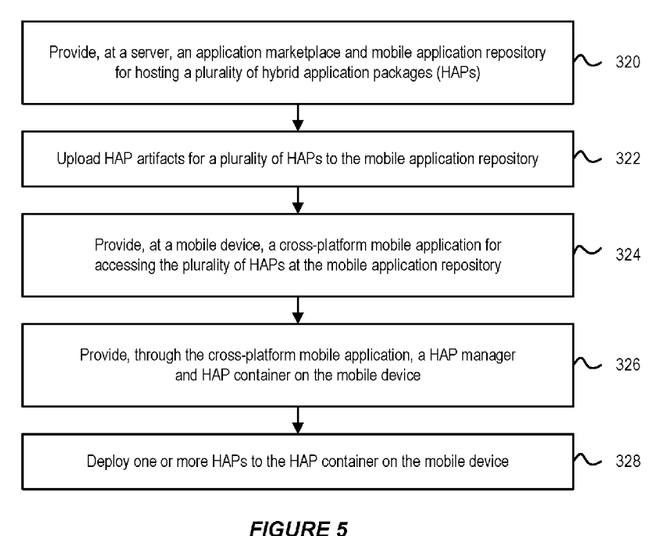
FIG. 5 illustrates a method for enabling cross-platform deployment of enterprise software applications, in accordance with an embodiment.

FIG. 5 illustrates a method for enabling cross-platform deployment of enterprise software applications, in accordance with an embodiment.

As described above, in accordance with an embodiment, a server-based deployment platform can include an application publisher, application marketplace, and mobile application repository, which together enable the publishing of a plurality of hybrid application packages that provide enterprise application functionality and can be rendered on different mobile device platforms; while a cross-platform mobile application at a mobile device enables rendering of the hybrid application packages, to provide access to their enterprise application functionality.

As illustrated in FIG. 5, in accordance with an embodiment, at step 320, the system provides, at a server, an application marketplace and mobile application repository for hosting a plurality of hybrid application packages.

At step 322, an enterprise utilizes the system to upload HAP artifacts, for a plurality of hybrid application packages, to the mobile application repository.

At step 324, the system provides, at the mobile device, a cross-platform mobile application for accessing the plurality of hybrid application packages.

At step 326, the system provides, through the cross-platform mobile application, a HAP manager and HAP container on the mobile device for accessing the plurality of hybrid application packages.

At step 328, the system deploys, through the cross-platform mobile application, the plurality of hybrid application packages to the HAP container on the mobile device.

Example Installation and Usage of Software Applications

As described above, in addition to enabling cross-platform deployment of enterprise software applications to different supported mobile platforms, the system enables centralized control by an enterprise over its enterprise applications, for example on an individualized or per-user basis, such that the enterprise can more readily control access, roles, and/or permissions granted to the users of its enterprise applications.

Figure 6:
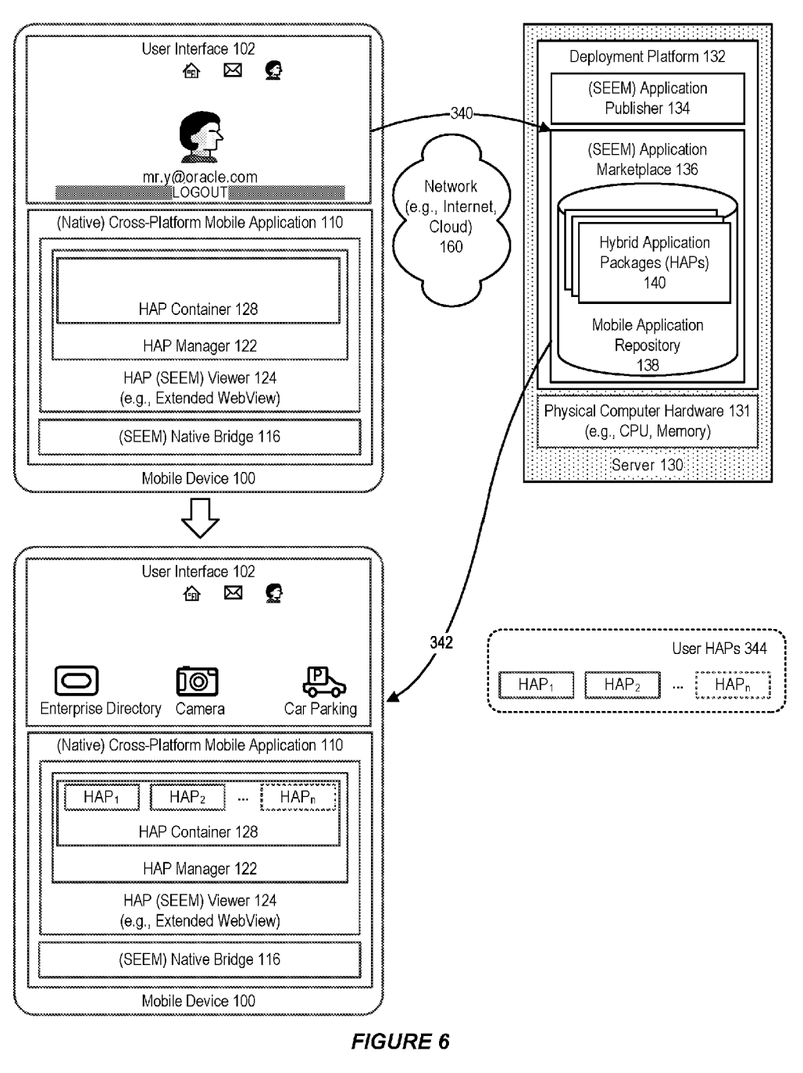
FIG. 6 illustrates an example installation and usage of one or more enterprise software applications, as mobile applications, to a mobile device, in accordance with an embodiment.

FIG. 6 illustrates an example installation and usage of one or more enterprise software applications, as mobile applications, to a mobile device, in accordance with an embodiment.

As illustrated in the example shown in FIG. 6, (which for clarity does not illustrate some of the components described above, such as physical device hardware, mobile operating system (OS) APIs, and/or native device capabilities), in accordance with an embodiment, a cross-platform mobile application can be downloaded to a mobile device from a suitable location, based on the type of device and its mobile platform, for example, from a cloud-based application store such as Apple's "App Store" for an iOS-based mobile device, or from "Google Play" for an Android-based mobile device.

In accordance with an embodiment, the cross-platform mobile application provides a login screen at the user interface, which enables a user to access a plurality of hybrid application packages via, for example, an enterprise single sign-on (SSO). The user's login credentials can be authenticated against an enterprise server, and registered with an enterprise repository (e.g., an enterprise database).

In accordance with an embodiment, after a user has logged in to the enterprise via the cross-platform mobile application, the cross-platform mobile application retrieves 340 a list of applications from the application marketplace, and displays one or more icons representing hybrid application packages that are available to the user through the cross-platform mobile application.

In response to a user's selection of a particular icon, a corresponding hybrid application package is deployed 342 (e.g., downloaded, extracted, and installed) from the mobile application repository, to a container (e.g., HAP container) provided by the cross-platform mobile application locally on the mobile device.

In accordance with an embodiment, the set of hybrid application packages that are displayed to a particular user as user HAPs 344 are generally limited to those hybrid application packages that an enterprise permits that particular user to access, in accordance with the user's role and permissions within the enterprise.

In accordance with an embodiment, a user can interact with a plurality of mobile applications, and can switch between mobile applications, without losing data and context associated with each application.

For example, as illustrated in FIG. 6, for a particular user, their home screen can display a plurality of icons representing hybrid application packages that have been deployed to the mobile device through the cross-platform mobile application.

In the illustrated example, a first icon represents an "Enterprise Directory" or employee lookup application, while a second icon represents a "Camera" application, and a third icon represents a "Car Parking" application. A user can select the first icon to open the "Enterprise Directory" hybrid application package, and can interact with the "Enterprise Directory" application by, for example, looking up a contact information for a particular employee.

In accordance with an embodiment, the hybrid application package and an associated HAP viewer can run in a same container; and the user can elect to multitask between the plurality of applications that are represented by the plurality of icons.

For example, as illustrated in FIG. 6, for a particular user, the "Camera" application can be provided as a web app that enables the user to capture an image using the mobile device's camera and upload the image to a webpage. As described above, in accordance with an embodiment, a native bridge provides the corresponding hybrid application package with access to the mobile device's camera. The user can switch back and forth between the "Camera" hybrid application package, and the "Enterprise Directory" hybrid application package, since both of these hybrid application packages, together with their data, are contained within the user's cross-platform mobile application.

In accordance with an embodiment, the cross-platform mobile application can also provide a pinning feature that enables a user to pin an icon for a hybrid application package to a home screen of their mobile device. By pinning the icon to the home screen, the corresponding hybrid application package can be more easily accessed by the user via their home screen.

In accordance with an embodiment, from a user's perspective, the system provides an improved user experience, which is substantially similar whether the user's mobile device operates on Android, iOS, or any other MOS; and is substantially similar as if the hybrid application package were running as a native mobile application on the mobile device.

Additionally, because the mobile device downloads only the hybrid application package, rather than an entire mobile hybrid application, the enterprise functionality that is provided by the hybrid application package occupies a smaller memory/storage footprint on the mobile device than a typical hybrid application.

Login Process

Figure 7:
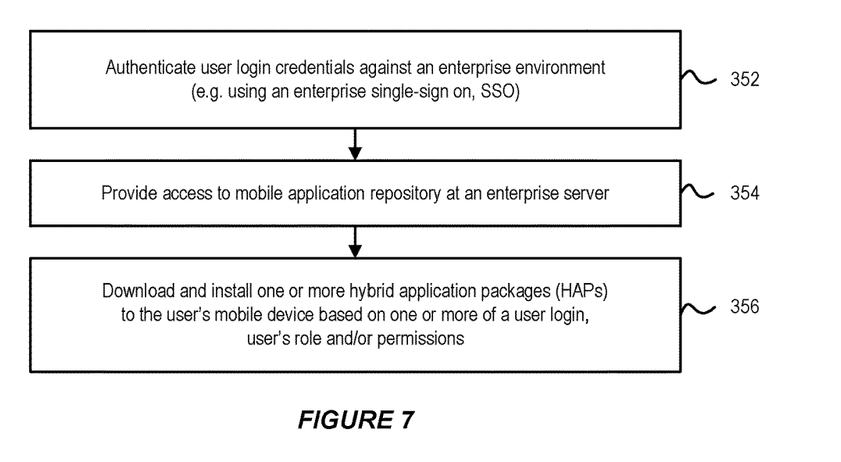
FIG. 7 illustrates an enterprise application login process, in accordance with an embodiment.

FIG. 7 illustrates an enterprise application login process, in accordance with an embodiment.

As described above, in accordance with an embodiment, the cross-platform mobile application provides a login screen at the user interface, which enables a user to access a plurality of hybrid application packages via, for example, an enterprise single sign-on (SSO).

As illustrated in FIG. 7, in accordance with an embodiment, at step 352, after receiving a user's login credentials, for example as entered by the user into a cross-platform mobile application provided on their mobile device, the login credentials can be authenticated against an enterprise environment (e.g., using SSO, or other authentication mechanism).

For example, in accordance with an embodiment, the cross-platform mobile application can transmit the user's login credentials to an enterprise server that compares the received login credentials with a database of user identities, roles, and permissions.

At step 354, the login credentials are registered with the enterprise server, to provide access to the mobile application repository.

At step 356, one or more relevant hybrid application packages for the user are downloaded and installed on the user's device. The hybrid application packages can be downloaded, for example, from an application marketplace as described above.

In accordance with an embodiment, the selection of relevant hybrid application packages for the user can be based on the login user's roles and permissions within the enterprise environment.

Access Revoke Process

Figure 8:
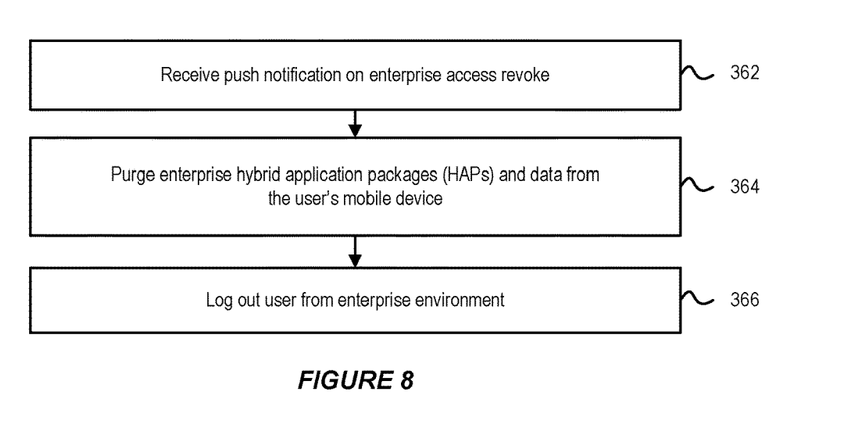
FIG. 8 illustrates an enterprise application access revoke process, in accordance with an embodiment.

FIG. 8 illustrates an enterprise application access revoke process, in accordance with an embodiment.

As described above, in accordance with an embodiment, an enterprise can elect to perform a remote wipe of a particular mobile device's enterprise application functionality, including the use of the HAP manager to revoke access by any user, at any point in time, via a push notification to the user's mobile device.

As illustrated in FIG. 8, in accordance with an embodiment, at step 362, after determining that a user is no longer an active user within an enterprise environment, the user's mobile device receives, via the cross-platform mobile application provided on their device, a push notification that the user's access is to be revoked.

At step 364, the cross-platform mobile application purges all enterprise hybrid application packages and associated data from the user's device.

At step 366, the cross-platform mobile application logs the user out.

Application List Process

Figure 9:
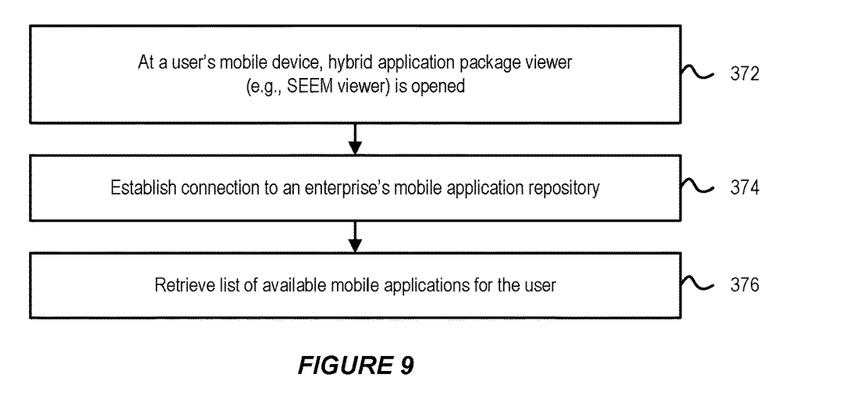
FIG. 9 illustrates an enterprise application list process, in accordance with an embodiment.

FIG. 9 illustrates an enterprise application list process, in accordance with an embodiment.

As illustrated in FIG. 9, in accordance with an embodiment, at step 372, at the user's mobile device, a HAP (SEEM) viewer is opened at the device.

At step 374, the cross-platform mobile application establishes a connection to a mobile application repository that is accessible to those enterprise users who are logged in and who have the appropriate permissions to access those mobile applications.

At step 376, the cross-platform mobile application retrieves a list of mobile applications available to the user, which list can be displayed to the user using the HAP viewer on their device.

Application Download Process

Figure 10:
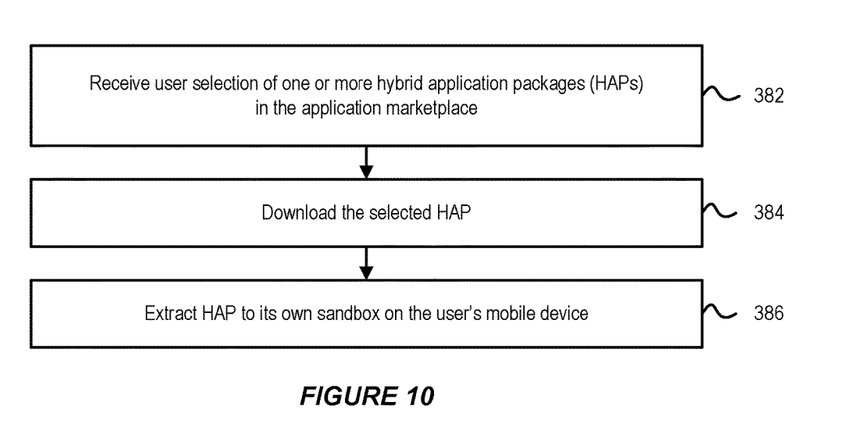
FIG. 10 illustrates an enterprise application download process, in accordance with an embodiment.

FIG. 10 illustrates an enterprise application download process, in accordance with an embodiment.

As illustrated in FIG. 10, in accordance with an embodiment, at step 382, the cross-platform mobile application receives a user's selection of a particular hybrid application package in the application marketplace (e.g., a SEEM Application Marketplace as described above).

For example, in accordance with an embodiment, the user can indicate the selection of a particular hybrid application package by a press and hold gesture at an icon displayed on a touch screen of the user's device.

At step 384, the cross-platform mobile application downloads the selected hybrid application package, for example, from a mobile application repository provided at a cloud server of the enterprise.

At step 386, the cross-platform mobile application extracts the HAP to its own sandbox on the user's device.

In accordance with an embodiment, the sandbox is provided by the cross-platform mobile application and serves as the extracted hybrid application package's own folder that permits the user to have rights to (in some instance, only) that folder.

Application Launch Process

Figure 11:
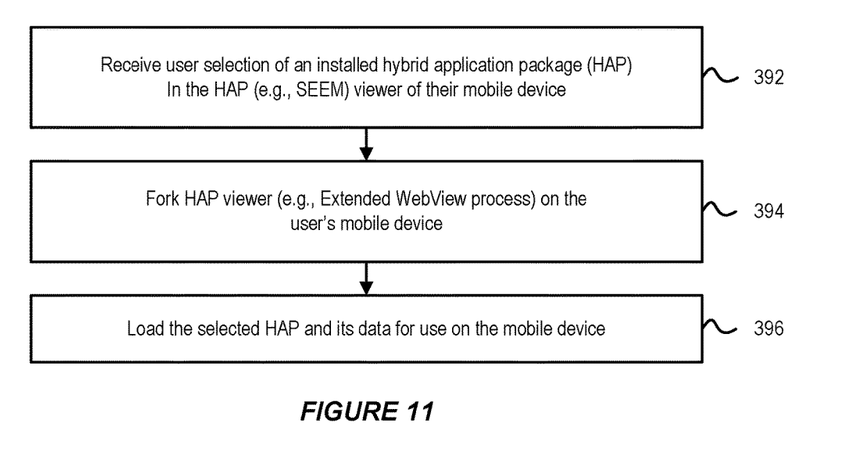
FIG. 11 illustrates an enterprise application launch process, in accordance with an embodiment.

FIG. 11 illustrates an enterprise application launch process, in accordance with an embodiment.

As illustrated in FIG. 11, in accordance with an embodiment, at step 392, the cross-platform mobile application receives a user selection of an installed hybrid application package in the HAP (SEEM) viewer.

At step 394, the cross-platform mobile application forks a HAP viewer, such as, for example, an extended WebView component, to render the hybrid application package on the user's mobile device.

At step 396, the cross-platform mobile application loads the selected hybrid application package and its data, including, for example, one or more of an associated session storage, local storage, or database content.

In accordance with an embodiment, the selected hybrid application package and its data can be isolated from other hybrid application packages and their data.

Additional Features

In accordance with an embodiment, while some of the embodiments described above illustrate the use of a system within iOS and Android environments; in accordance with various embodiments, the components, features, and methods described herein can be similarly used with other types of mobile platforms and mobile operating system environments.

In accordance with an embodiment, the system can be used to provide an application shell around one or more deployed hybrid application packages, to isolate them and their associated data from other hybrid application packages on a user's device, thereby improving the security of the hybrid application packages in the shell.

In accordance with an embodiment, the system can provide a management console that enables an enterprise to, for example, add, update, and manage hybrid application packages, create rules for specific hybrid application packages, provide access to certain hybrid application packages for particular users, and revoke access by particular users.

In accordance with an embodiment, the system can be integrated with other mobile application development tools, such as, for example, Oracle's Mobile Application Accelerator (MAX) and Oracle's JavaScript Extension Toolkit (OJET).

For example, in accordance with an embodiment, MAX and OJET applications can be published to an application marketplace (e.g., a SEEM Application Marketplace as described above) and deployed to a user's mobile device through a cross-platform mobile application as described above.

Embodiments of the present invention can be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for use in cross-platform deployment of mobile applications, the system comprising:
   a mobile device including a processor; and
   a cross-platform mobile application provided at the mobile device that includes a hybrid application package manager and a hybrid application package container, for use in managing and storing one or more hybrid application packages that are received from a server-based deployment platform,
   wherein each hybrid application package, of a plurality of hybrid application packages that are offered by the deployment platform, provides enterprise application functionalities that is configured to be rendered on different mobile device platforms, and
   wherein the deployment platform includes
      a mobile application repository that stores the plurality of hybrid application packages, and
      an application marketplace that offers the plurality of hybrid application packages that are stored in the mobile application repository for selective downloading by mobile devices;
   wherein the one or more hybrid application packages that are received at the mobile device are deployed to the hybrid application package container provided by the cross-platform mobile application, wherein the hybrid application package container operates as a centralized container on the mobile device to enable user access to the hybrid application packages;
   wherein a new instance of the hybrid application package container is created using the hybrid application package container in order to execute the hybrid application package; and
   wherein the cross-platform mobile application provides access to the enterprise application functionalities provided by the one or more hybrid application packages that are deployed to its hybrid application package container and rendered at the mobile device to provide access to enterprise application functionality.

2. The system of claim 1, wherein the server-based deployment platform includes
   an application publisher, and
   the application marketplace,
   that enables publishing of the plurality of hybrid application packages which provide enterprise application functionality and are configured to be rendered on different mobile device platforms.

3. The system of claim 1, wherein the server-based deployment platform receives the one or more hybrid application packages from one or more hybrid application frameworks.

4. The system of claim 1, wherein the cross-platform mobile application further comprises a view component and a hybrid application, package viewer for rendering the hybrid application packages on the mobile device.

5. The system of claim 1, wherein the cross-platform mobile application further comprises a native bridge that provides the one or more hybrid application packages at the mobile device with access to one or more mobile operating system APIs or native device capabilities of the mobile device.

6. The system of claim 1, wherein the server-based deployment platform includes
   an application publisher, and
   the application marketplace,
   that enables publishing of the plurality of hybrid application packages which provide enterprise application functionality and are configured to be rendered on different mobile device platforms; and
   wherein the cross-platform mobile application further comprises a view component and a hybrid application package viewer for rendering the hybrid application packages on the mobile device.

7. The system of claim 1, wherein the cross-platform mobile application communicates via at least one of a network or cloud environment with the application marketplace, to receive an appropriate hybrid application package.

8. A method for use in cross-platform deployment of mobile applications, the method comprising:
  providing, at a mobile device including a processor, a cross-platform mobile application that includes a hybrid application package manager and a hybrid application package container, for use in managing and storing one or more hybrid application packages that are received from a server-based deployment platform,
  wherein each hybrid application package, of a plurality of hybrid application packages that are offered by the deployment platform, provides enterprise application functionalities that are configured to be rendered on different mobile device platforms, and
  wherein the deployment platform includes
    a mobile application repository that stores the plurality of hybrid application packages, and
    an application marketplace that offers the plurality of hybrid application packages that are stored in the application repository for selective downloading by mobile devices;
  wherein the one or more hybrid application packages that are received at the mobile device are deployed to the hybrid application package container provided by the cross-platform mobile application, wherein the hybrid application package container operates as a centralized container on the mobile device to enable user access to the hybrid application packages;
  wherein a new instance of the hybrid application package container is created using the hybrid application package container in order to execute the hybrid application package; and
  wherein the cross-platform mobile application provides access via the cross-platform mobile application to the enterprise application functionalities provided by the one or more hybrid application packages that are deployed to its hybrid application package container and rendered at the mobile device to provide access to enterprise application functionality.

9. The method of claim 8, wherein the server-based deployment platform includes
  an application publisher, and
  the application marketplace,
  that enables publishing of the plurality of hybrid application packages which provide enterprise application functionality and are configured to be rendered on different mobile device platforms.

10. The method of claim 8, wherein the server-based deployment platform receives the one or more hybrid application packages from one or more hybrid application frameworks.

11. The method of claim 8, wherein the cross-platform mobile application further comprises a view component and a hybrid application package viewer for rendering the hybrid application packages on the mobile device.

12. The method of claim 8, wherein the cross-platform mobile application further comprises a native bridge that provides the one or more hybrid application packages at the mobile device with access to one or more mobile operating system APIs or native device capabilities of the mobile device.

13. The method of claim 8, wherein the server-based deployment platform includes
  an application publisher, and
  the application marketplace,
  that enables publishing of the plurality of hybrid application packages which provide enterprise application functionality and are configured to be rendered on different mobile device platforms; and
  wherein the cross-platform mobile application further comprises a view component and a hybrid application package viewer for rendering the hybrid application packages on the mobile device.

14. The method of claim 8, wherein the cross-platform mobile application communicates via at least one of a network or cloud environment with the application marketplace, to receive an appropriate, hybrid application package.

15. A non-transitory computer readable storage medium, including instructions stored therein which when executed by a mobile device including a processor perform a method comprising:
  providing a cross-platform mobile application that includes a hybrid application package manager and a hybrid application package container, for use in managing and storing one or more hybrid application packages that are received from a server-based deployment platform,
  wherein each hybrid application package, of a plurality of hybrid application packages that are offered by the deployment platform, provides enterprise application functionalities that are configured to be rendered on different mobile device platforms, and
  wherein the deployment platform includes
    a mobile application repository that stores the plurality of hybrid application packages, and
    an application marketplace that offers the plurality of hybrid application packages that are stored in the mobile application repository for selective downloading by mobile devices;
  wherein the one or more hybrid application packages that are received at the mobile device are deployed to the hybrid application package container provided by the cross-platform mobile application, wherein the hybrid application package container operates as a centralized container on the mobile device to enable user access to the hybrid application packages;
  wherein a new instance of the hybrid application package container is created using the hybrid application package container in order to execute the hybrid application package; and
  wherein the cross-platform mobile application provides access via the cross-platform mobile application to the enterprise application functionalities provided by the one or more hybrid application packages that are deployed to its hybrid application package container and rendered at the mobile device to provide access to enterprise application functionality.

16. The non-transitory computer readable storage medium of claim 15, wherein the server-based deployment platform includes
  an application publisher, and
  the application marketplace,
  that enables publishing of the plurality of hybrid application packages which provide enterprise application functionality and are configured to be rendered on different mobile device platforms.

17. The non-transitory computer readable storage medium of claim 15, wherein the server-based deployment platform receives the one or more hybrid application packages from one or more hybrid application frameworks.

18. The non-transitory computer readable storage medium of claim 15, wherein the cross-platform mobile application further comprises a view component and a hybrid application package viewer for rendering the hybrid application packages on the mobile device.

19. The non-transitory computer readable storage medium of claim 15, wherein the cross-platform mobile application, further comprises a native bridge that provides the one or more hybrid application packages at the mobile device with access to one or more mobile operating system APIs or native device capabilities of the mobile device.

20. The non-transitory computer readable storage medium of claim 15, wherein the cross-platform mobile application communicates via at least one of a network or cloud environment with the application marketplace, to receive an appropriate hybrid application package.

\* \* \* \* \*

UNITED STATES PATENT AND TRADEMARK OFFICE
CERTIFICATE OF CORRECTION

PATENT NO. : 10,101,985 B1
APPLICATION NO. : 15/592530
DATED : October 16, 2018
INVENTOR(S) : Prakash et al.

Page 1 of 1

It is certified that error appears in the above-identified patent and that said Letters Patent is hereby corrected as shown below:

In Column 5, Line 20, delete "Publishers$_1$" and insert -- Publisher$_1$ --, therefor.

In Column 12, Line 46, in Claim 4, delete "application," and insert -- application --, therefor.

In Column 13, Line 21, in Claim 8, after "the" insert -- mobile --.

In Column 14, Line 14, in Claim 14, delete "appropriate," and insert -- appropriate --, therefor.

In Column 15, Line 7, in Claim 19, delete "application," and insert -- application --, therefor.

Signed and Sealed this
Thirty-first Day of December, 2019

Andrei Iancu
*Director of the United States Patent and Trademark Office*